United States Patent
Mitsui et al.

(10) Patent No.: US 10,923,781 B2
(45) Date of Patent: Feb. 16, 2021

(54) RECOVERING DEVICE AND RECOVERING METHOD FOR RECOVERING NICKEL-METAL HYDRIDE BATTERY

(71) Applicant: Toyota Jidosha Kabushiki Kaisha, Toyota (JP)

(72) Inventors: Masahiko Mitsui, Toyota (JP); Junta Izumi, Nagoya (JP); Kazuya Kodama, Tajimi (JP); Kenji Kimura, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 132 days.

(21) Appl. No.: 16/223,829

(22) Filed: Dec. 18, 2018

(65) Prior Publication Data
US 2019/0198949 A1   Jun. 27, 2019

(30) Foreign Application Priority Data
Dec. 25, 2017   (JP) .................................. 2017-247468

(51) Int. Cl.
| | |
|---|---|
| H01M 10/54 | (2006.01) |
| H01M 10/34 | (2006.01) |
| H01M 4/04 | (2006.01) |
| H01M 10/44 | (2006.01) |
| H01M 10/48 | (2006.01) |
| H01M 10/633 | (2014.01) |
| H01M 10/42 | (2006.01) |
| H01M 10/613 | (2014.01) |
| H01M 2/12 | (2006.01) |
| H01M 10/6567 | (2014.01) |

(52) U.S. Cl.
CPC ............. *H01M 10/54* (2013.01); *H01M 2/12* (2013.01); *H01M 4/0447* (2013.01); *H01M 10/345* (2013.01); *H01M 10/4242* (2013.01); *H01M 10/44* (2013.01); *H01M 10/48* (2013.01); *H01M 10/613* (2015.04); *H01M 10/633* (2015.04); *H01M 10/6567* (2015.04)

(58) Field of Classification Search
CPC ........... H01M 10/345; H01M 10/4242; H01M 10/44; H01M 10/48; H01M 10/54; H01M 10/613; H01M 10/633; H01M 10/6567; H01M 2/12; H01M 4/0447; Y02E 60/10; Y02W 30/84
See application file for complete search history.

(56) References Cited

FOREIGN PATENT DOCUMENTS

JP   2014-207789 A   10/2014

*Primary Examiner* — Lingwen R Zeng
(74) *Attorney, Agent, or Firm* — Dinsmore & Shohl LLP (57) ABSTRACT

A recovering device includes a charging chamber configured to overcharge a nickel-metal hydride battery. The charging chamber is provided with: a first water bath; a fixing device configured to fix the nickel-metal hydride battery with a portion of a container of the nickel-metal hydride battery being immersed in the water coolant in the first water bath; a pump; a dial gauge configured to detect a deformation amount of the container of the nickel-metal hydride battery; and a collection container configured to collect the gas exhausted from the exhaust valve of the nickel-metal hydride battery and exhaust the gas to outside the recovering device. The recovering device further includes a controller configured to perform the overcharging process for the nickel-metal hydride battery. The controller is configured to halt the overcharging process when the deformation amount of the container exceeds a threshold value.

5 Claims, 8 Drawing Sheets

RECOVERING DEVICE AND RECOVERING METHOD FOR RECOVERING NICKEL-METAL HYDRIDE BATTERY

CROSS-REFERENCE TO RELATED APPLICATION

This nonprovisional application claims priority to Japanese Patent Application No. 2017-247468 filed on Dec. 25, 2017, with the Japan Patent Office, the entire contents of which are hereby incorporated by reference.

BACKGROUND

Field

The present disclosure relates to a technique for restoring the capacity of a nickel-metal hydride battery to recover the nickel-metal hydride battery.

Description of the Background Art

Japanese Patent Laying-Open No. 2014-207789 discloses a technique for restoring the capacity of a nickel-metal hydride battery. In this technique, a nickel-metal hydride battery including a negative electrode having a deteriorated discharging capacity is overcharged to supply the negative electrode with hydrogen. Accordingly, the discharging capacity of the negative electrode can be restored, thereby restoring the capacity of the entire battery.

SUMMARY

As described above, in the technique disclosed in Japanese Patent Laying-Open No. 2014-207789, the nickel-metal hydride battery is overcharged to supply the negative electrode with hydrogen, thereby restoring the discharging capacity of the negative electrode.

For efficient capacity restoration, it is considered to apply a large amount of current to the nickel-metal hydride battery in order to quickly complete the above-described overcharging. However, when a large amount of current is applied to the nickel-metal hydride battery, the temperature of the nickel-metal hydride battery is likely to be increased, thus resulting in a difficulty in management thereof.

The present disclosure has been made to solve the above-described problem, and has an object to provide a recovering device and a recovering method, by each of which the capacity of a nickel-metal hydride battery can be restored efficiently and appropriately.

(1) A device according to the present disclosure is a recovering device for recovering a nickel-metal hydride battery having a container provided with an exhaust valve configured to exhaust gas generated in the container to outside. The recovering device includes: a liquid bath configured to store liquid coolant; a fixing device configured to fix the nickel-metal hydride battery to the liquid bath with at least a portion of the container of the nickel-metal hydride battery being immersed in the liquid coolant in the liquid bath; a circulating device configured to circulate the liquid coolant in the liquid bath; a deformation amount detector configured to detect a deformation amount of the container of the nickel-metal hydride battery with the nickel-metal hydride battery being fixed to the liquid bath by the fixing device; an exhausting device configured to collect the gas exhausted from the exhaust valve of the nickel-metal hydride battery and exhaust the gas to outside the recovering device; a charger configured to charge the nickel-metal hydride battery; and a controller configured to perform an overcharging process for overcharging, using the charger, the nickel-metal hydride battery fixed to the liquid bath by the fixing device while circulating the liquid coolant in the liquid bath using the circulating device. During the overcharging process, the controller is configured to: continue the overcharging process when the deformation amount of the container is less than a threshold value; and halt the overcharging process when the deformation amount of the container exceeds the threshold value.

According to the above-described device, during the overcharging process for the nickel-metal hydride battery, the deformation amount of the container can be monitored while cooling the container of the nickel-metal hydride battery using the liquid coolant and exhausting the gas generated in the container to outside. Therefore, for example, even when applying a large amount of current to the nickel-metal hydride battery in the overcharging process in order to quickly complete the overcharging, the overcharging process can be performed while precisely monitoring whether or not an abnormality occurs in the nickel-metal hydride battery. As a result, the overcharging process (capacity restoration) for the nickel-metal hydride battery can be performed efficiently and appropriately.

(2) In a certain embodiment, during the overcharging process, the controller is configured to increase an amount of operation of the circulating device in response to an increase in the deformation amount of the container.

According to the above-described embodiment, during the overcharging process, the amount of operation of the circulating device is increased in response to the increase in the deformation amount of the container. Accordingly, the efficiency of cooling the container by the liquid coolant is increased, thereby suppressing temperature increase in the container. Accordingly, the overcharging process can be continued while appropriately suppressing occurrence of an abnormality resulting from overheating.

(3) In a certain embodiment, the recovering device further includes a voltage detector configured to detect voltage of the nickel-metal hydride battery. During the overcharging process, the controller is configured to halt the overcharging process when a magnitude of an amount of change of the voltage of the nickel-metal hydride battery per unit time exceeds a predetermined value.

According to the above-described embodiment, during the overcharging process, the overcharging process can be halted appropriately when the voltage of the nickel-metal hydride battery is abruptly changed due to occurrence of an abnormality such as abrupt chemical change or disconnection of a wire in the nickel-metal hydride battery.

(4) In a certain embodiment, the exhausting device is configured to collect, by water displacement, the gas generated in the container of the nickel-metal hydride battery and exhaust the gas to outside the recovering device.

According to the above-described embodiment, the gas generated within the container of the nickel-metal hydride battery can be completely collected by the water displacement and the collected gas can be exhausted to outside appropriately.

(5) A method according to the present disclosure is a recovering method for recovering a nickel-metal hydride battery having a container provided with an exhaust valve configured to exhaust gas generated in the container to outside. The recovering method includes: determining whether or not a deformation amount of the container exceeds a threshold value during an overcharging process for overcharging the nickel-metal hydride battery with at least a portion of the container of the nickel-metal hydride battery being cooled by liquid coolant; continuing the overcharging process when the deformation amount of the container is less than the threshold value; and halting the overcharging process when the deformation amount of the container exceeds the threshold value.

According to the above-described method, during the overcharging process for the nickel-metal hydride battery, whether or not the deformation amount of the container exceeds the threshold value can be monitored while cooling the container of the nickel-metal hydride battery using the liquid coolant and exhausting the gas generated in the container to outside the container. Therefore, for example, even when applying a large amount of current to the nickel-metal hydride battery in the overcharging process in order to quickly complete the overcharging, the overcharging can be performed while precisely monitoring whether or not an abnormality occurs in the nickel-metal hydride battery. As a result, the overcharging process (capacity restoration) for the nickel-metal hydride battery can be performed efficiently and appropriately.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

The following describes embodiments of the present disclosure with reference to figures in detail. It should be noted that the same or corresponding portions in the figures are given the same reference characters and are not described repeatedly.

<Configuration of Nickel-Metal Hydride Battery>

Figure 1:
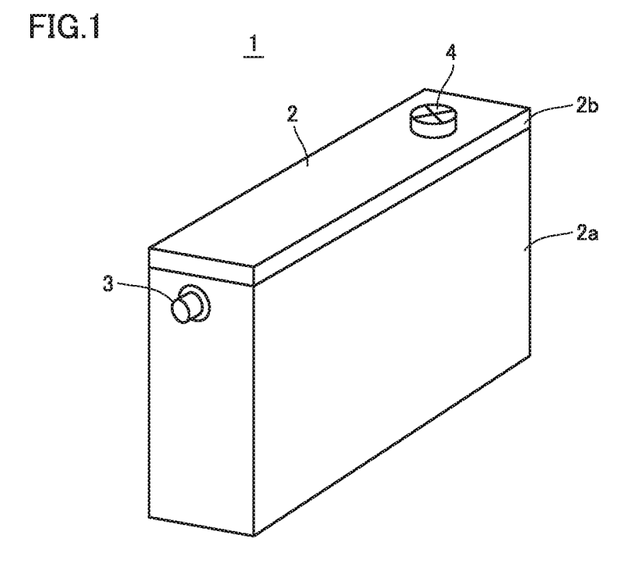
FIG. 1 is a perspective view of a nickel-metal hydride battery.

FIG. 1 is a perspective view of a nickel-metal hydride battery 1 (hereinafter, also simply referred to as "battery 1") to be recovered by a recovering method in a recovering device according to the present embodiment.

Battery 1 is mounted on an electrically powered vehicle or the like such as a hybrid vehicle or an electric vehicle, for example. Battery 1 is a sealed nickel hydrogen storage battery, and the inside of battery 1 is covered with a container 2 having a rectangular parallelepiped shape.

Container 2 is composed of a resin, for example. Although not shown in the figure, container 2 includes a positive electrode plate, a negative electrode plate, and an electrolyte solution that ionically combines them with each other. It should be noted that an internal structure of container 2 is equivalent to an internal structure of a known nickel-metal hydride battery 1.

Container 2 includes: a tubular portion 2a provided with an opening at its upper side; and a cover portion 2b having a rectangular-plate shape and covering the opening of tubular portion 2a. The inside of container 2 is sealed with tubular portion 2a and cover portion 2b.

Electrode terminals 3 and an exhaust valve 4 are provided on surfaces of container 2. Electrode terminals 3 are provided on side surfaces of container 2 (more specifically, side surfaces of tubular portion 2a). It should be noted that although only one electrode terminal 3 is shown in FIG. 1, another electrode terminal 3 is actually provided on a side surface opposite to the side surface thereof on which electrode terminal 3 shown in FIG. 1 is provided. That is, two electrode terminals 3 (positive electrode terminal and negative electrode terminal) are provided in battery 1.

Exhaust valve 4 is provided on the upper surface of container 2 (more specifically, the upper surface of cover portion 2b). When the internal pressure of container 2 is less than a predetermined valve opening pressure, exhaust valve 4 maintains the inside of container 2 in the sealed state. On the other hand, when the internal pressure of container 2 reaches the valve opening pressure, exhaust valve 4 automatically opens to exhaust gas in container 2 to outside container 2.

<Configuration of Recovering Device for Recovering Nickel-Metal Hydride Battery>

Hereinafter, a recovering device 5 (see FIG. 2) for battery 1 according to the present embodiment will be described.

Generally, the capacity of a nickel-metal hydride battery can be deteriorated gradually due to use (repeated charging and discharging). It is considered that one of the causes of the deterioration of the capacity is deterioration of the capacity of a negative electrode due to dissociation of hydrogen from a hydrogen storage alloy of the negative electrode. Therefore, in the present embodiment, the capacity of the negative electrode is restored by performing overcharging to battery 1 to supply the negative electrode with hydrogen, thereby restoring the capacity of battery 1. It should be noted that the term "overcharging" herein refers to charging by supplying the nickel-metal hydride battery with an amount of electric power exceeding the rated capacity of the nickel-metal hydride battery (for example, an amount of electric power about 1.5 to 2 times as large as the rated capacity).

For efficient capacity restoration of battery 1, it is considered to apply a large amount of current to battery 1 in order to quickly complete the above-described overcharging. However, it is concerned that when a large amount of current is applied to battery 1, the temperature of battery 1 is likely to be increased, thus resulting in a difficulty in management thereof.

Moreover, when battery 1 is overcharged, the water content of the electrolyte solution in container 2 is electrolyzed to generate gas including hydrogen and oxygen, with the result that the internal pressure of container 2 is increased. Accordingly, the gas generated within container 2 can be exhausted from exhaust valve 4. Since both hydrogen and oxygen are included in this gas as described above, it is desired to completely collect the gas exhausted from exhaust valve 4 and exhaust the gas to outside appropriately.

Further, it is also concerned that when a larger amount of gas than an amount of gas that can be exhausted from exhaust valve 4 is generated within container 2, the internal pressure of container 2 exceeds the permissible value, with the result that container 2 is broken.

Recovering device 5 according to the present embodiment is configured in various ways to solve the above-described problem in recovering (overcharging) a nickel-metal hydride battery. Hereinafter, the configuration of recovering device 5 will be described in detail.

Figure 2:
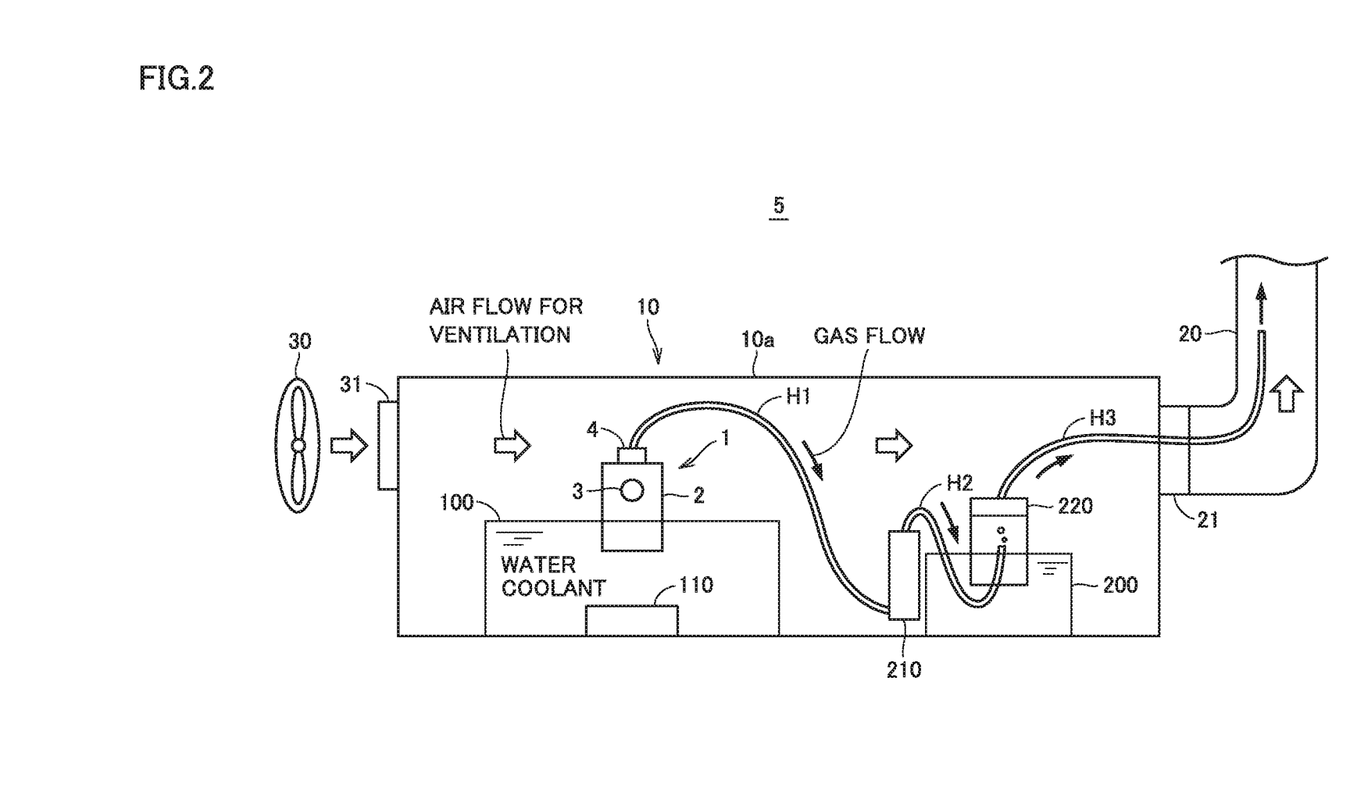
FIG. 2 schematically shows a configuration of a charging chamber included in a recovering device and a vicinity thereof.

FIG. 2 schematically shows a configuration of a charging chamber 10 included in recovering device 5 according to the present embodiment and a vicinity thereof. Recovering device 5 includes charging chamber 10, an exhaust duct 20, and a fan 30.

Charging chamber 10 is covered with a case 10a, and battery 1 is overcharged in case 10a. Case 10a is provided with: an inlet 31 via which air from fan 30 is suctioned; and an outlet 21 connected to exhaust duct 20. By operating fan 30, charging chamber 10 can be ventilated.

In charging chamber 10, a first water bath 100, a second water bath 200, a flow meter 210, a collection container 220, and pipes H1 to H3 are installed.

Water coolant for cooling battery 1 is stored in first water bath 100. Battery 1 is placed in first water bath 100 with a portion of container 2 below electrode terminals 3 being immersed in the water coolant in first water bath 100.

In first water bath 100, a pump 110 is disposed to circulate the water coolant in first water bath 100. When overcharging battery 1, pump 110 is operated to circulate the water coolant in first water bath 100. Accordingly, battery 1 can be cooled by water cooling, which allows for cooling efficiency higher than that of air cooling. Accordingly, when overcharging battery 1, battery 1 is less likely to have a high temperature, whereby container 2 is less likely to be broken due to an increase in internal pressure of container 2.

Second water bath 200 stores water for collecting, by water displacement, gas exhausted from exhaust valve 4 when overcharging battery 1. Collection container 220 is a container (such as a graduated cylinder) for collecting the gas exhausted from battery 1. In an initial state, the water of second water bath 200 is in collection container 220.

Exhaust valve 4 of battery 1 communicates with the inside of collection container 220 via pipe H1, flow meter 210, and pipe H2. The upper portion of collection container 220 communicates with the inside of exhaust duct 20 via pipe H3. According to such a configuration, when overcharging battery 1, the gas exhausted from exhaust valve 4 of battery 1 can be completely collected in collection container 220 by the water displacement and then can be exhausted to outside charging chamber 10 (exhaust duct 20) appropriately. Moreover, the flow rate (hereinafter, also simply referred to as "gas flow rate") of the gas exhausted from exhaust valve 4 of battery 1 can be detected by flow meter 210.

Figure 3:
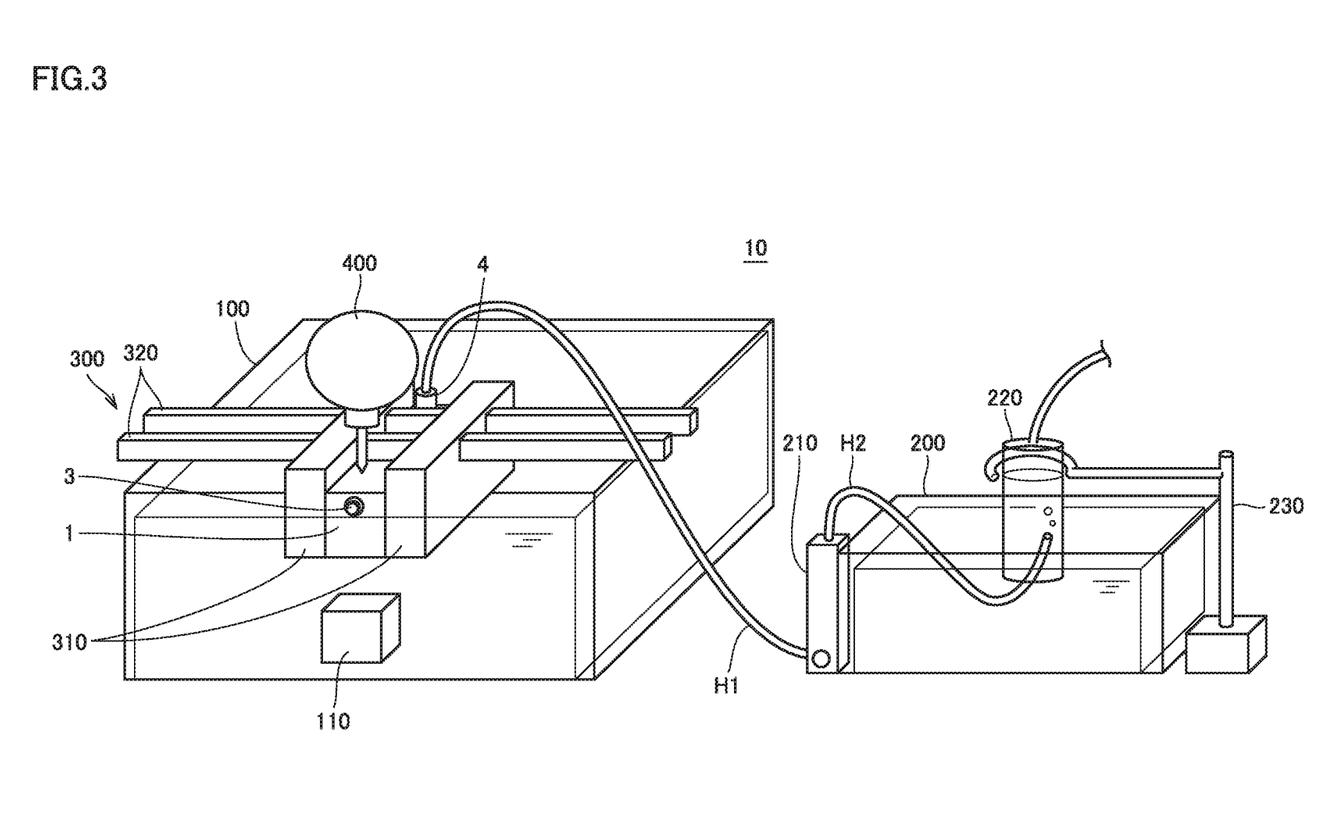
FIG. 3 is a perspective view showing an internal configuration of the charging chamber.

FIG. 3 is a perspective view showing the internal configuration of charging chamber 10. As described above with reference to FIG. 2, first water bath 100, second water bath 200, flow meter 210, and collection container 220 are provided in charging chamber 10.

Furthermore, a fixing device 300, a dial gauge 400, and a supporting member 230 are included in charging chamber 10.

Fixing device 300 is a device configured to fix battery 1 to first water bath 100 with the portion of container 2 below electrode terminals 3 in battery 1 being immersed in the water coolant in first water bath 100. Fixing device 300 includes: a pair of plates 310 configured to sandwich battery 1 therebetween; and a supporting member 320 configured to support plates 310.

Dial gauge 400 is configured to detect a deformation amount (hereinafter, also simply referred to as "container deformation amount") of the upper surface of container 2 of battery 1 with battery 1 being fixed to first water bath 100 by fixing device 300. By monitoring the container deformation amount detected by dial gauge 400, it is possible to precisely monitor whether or not an abnormality that may lead to breakage of container 2 due to increased internal pressure of container 2 occurs in battery 1.

Supporting member 230 is a member configured to support collection container 220 with the water of second water bath 200 being in collection container 220.

Figure 4:
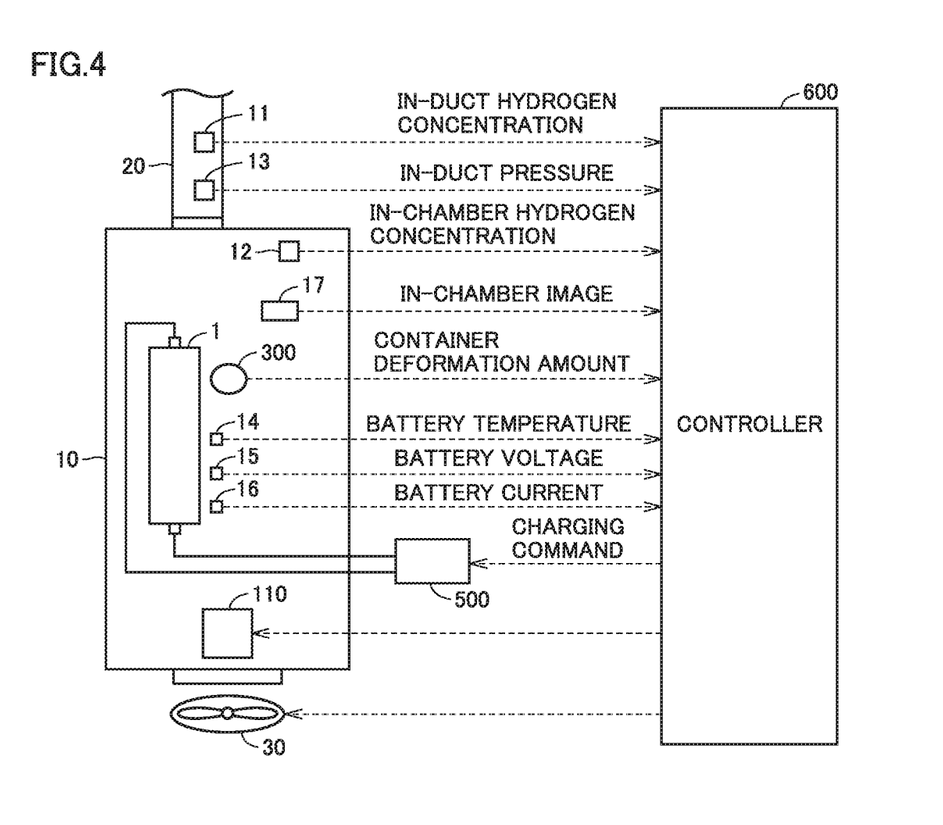
FIG. 4 is a block diagram showing an exemplary entire configuration of the recovering device.

FIG. 4 is a block diagram showing an exemplary entire configuration of recovering device 5 according to the present embodiment. As described above with reference to FIGS. 2 and 3, recovering device 5 includes charging chamber 10, exhaust duct 20, and fan 30.

Further, recovering device 5 includes hydrogen concentration sensors 11, 12, a pressure sensor 13, a temperature sensor 14, a voltage sensor 15, a current sensor 16, a monitoring camera 17, a charger 500, and a controller 600.

Hydrogen concentration sensor 11 and pressure sensor 13 are provided in exhaust duct 20. Hydrogen concentration sensor 11 detects a hydrogen concentration (hereinafter, also referred to as "in-duct hydrogen concentration") in exhaust duct 20. Pressure sensor 13 detects pressure (hereinafter, also referred to as "in-duct pressure") in exhaust duct 20.

Hydrogen concentration sensor 12, temperature sensor 14, voltage sensor 15, and current sensor 16 are provided in charging chamber 10. Hydrogen concentration sensor 12 detects a hydrogen concentration (hereinafter, also referred to as "in-chamber hydrogen concentration") in charging chamber 10. Temperature sensor 14 detects a temperature (hereinafter, also referred to as "battery temperature") of battery 1 placed in charging chamber 10. Voltage sensor 15 detects voltage (hereinafter, also referred to as "battery voltage") of battery 1 placed in charging chamber 10. Current sensor 16 detects current (hereinafter, also referred to as "battery current") flowing in battery 1 placed in charging chamber 10.

Each of these sensors 11 to 16 outputs a detection result to controller 600.

Monitoring camera 17 captures an image of a situation inside charging chamber 10, and outputs the image (hereinafter, also referred to as "in-chamber image") to controller 600.

Charger 500 is provided outside charging chamber 10, and is connectable to battery 1 placed in charging chamber 10. When charger 500 is connected to battery 1 placed in charging chamber 10, charger 500 is configured to charge battery 1 in accordance with a charging command from controller 600.

Controller 600 includes a CPU (Central Processing Unit) and a memory (not shown), and controls pump 110, fan 30, and charger 500 based on information stored in the memory or information from each of sensors 11 to 15 and monitoring camera 17.

<Overcharging Process for Nickel-Metal Hydride Battery>

Next, the overcharging process according to the present embodiment will be described.

Controller 600 is configured to perform the "overcharging process" for overcharging battery 1 using charger 500 while circulating the water coolant in first water bath 100 by operating pump 110 with battery 1 being fixed to first water bath 100 by fixing device 300.

Further, during the overcharging process, controller 600 is configured to monitor the container deformation amount. When the container deformation amount is less than a threshold value N1, the overcharging process is continued, whereas when the container deformation amount exceeds threshold value N1, the overcharging process is halted.

Accordingly, the container deformation amount can be monitored while cooling container 2 of battery 1 by water-cooling and exhausting the gas generated in container 2 to outside. Therefore, for example, even when applying a large amount of current to battery 1 in the overcharging process in order to quickly complete the overcharging process, the overcharging process can be performed while precisely monitoring whether or not an abnormality occurs in container 2 of battery 1. As a result, the overcharging process (capacity restoration) for battery 1 can be performed efficiently and appropriately.

Figure 5:
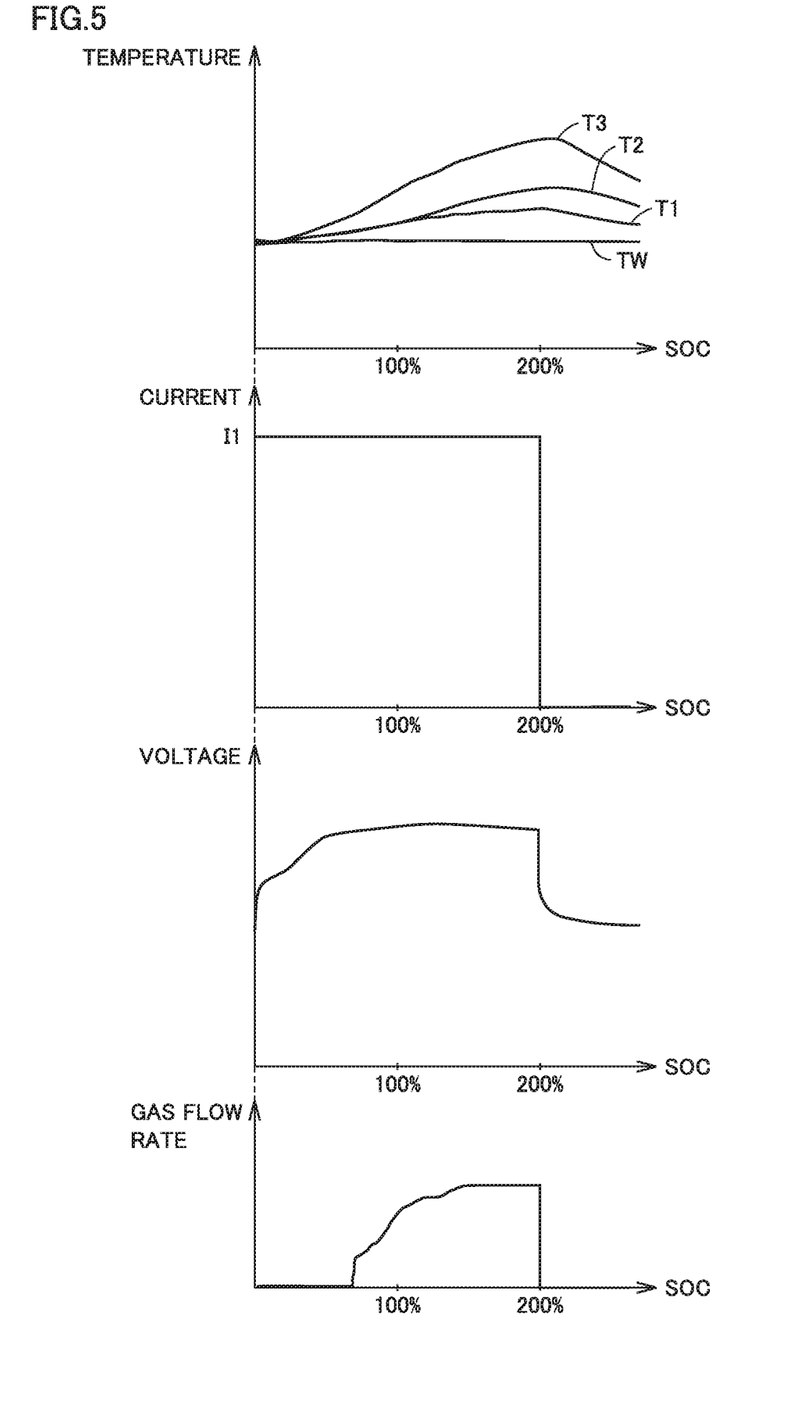
FIG. 5 shows exemplary changes in battery temperature, battery current, battery voltage, and gas flow rate when the overcharging process is performed normally.

FIG. 5 shows exemplary changes in battery temperature, battery current, battery voltage, and gas flow rate when the overcharging process is performed normally. In FIG. 5, the horizontal axis indicates SOC (State Of Charge) of battery 1, whereas the vertical axis indicates the battery temperature, the battery current, the battery voltage, and the gas flow rate in this order from above. It should be noted that FIG. 5 illustratively shows that battery 1 is overcharged with an amount of electric power (SOC 200%) twice as large as the rated capacity of battery 1 by using a comparatively large current value I1 (for example, 60 amperes).

In the figure showing the change of the battery temperature, a curve T1 represents a temperature of the upper portion of battery 1, a curve T2 represents a temperature of the bottom portion of battery 1, and a curve T3 represents a temperature of the side portion of battery 1. It should be noted that a line TW indicates a temperature of the water coolant in first water bath 100.

In the present embodiment, battery 1 is cooled by the water cooling allowing for cooling efficiency higher than that in the air cooling. Hence, as shown in FIG. 5, even when comparatively large current value I1 is applied to battery 1 in the overcharging process, curves T1 to T3 representing the respective temperatures of the portions of the battery are restrained to values close to the value of line TW representing the temperature of the water coolant. Accordingly, the overcharging process can be completed quickly, whereby the capacity of battery 1 can be restored efficiently.

Further, during the overcharging process, controller 600 determines presence/absence of an abnormality using the container deformation amount as a parameter, and determines whether to continue or halt the overcharging process in accordance with a result thereof.

Figure 6:
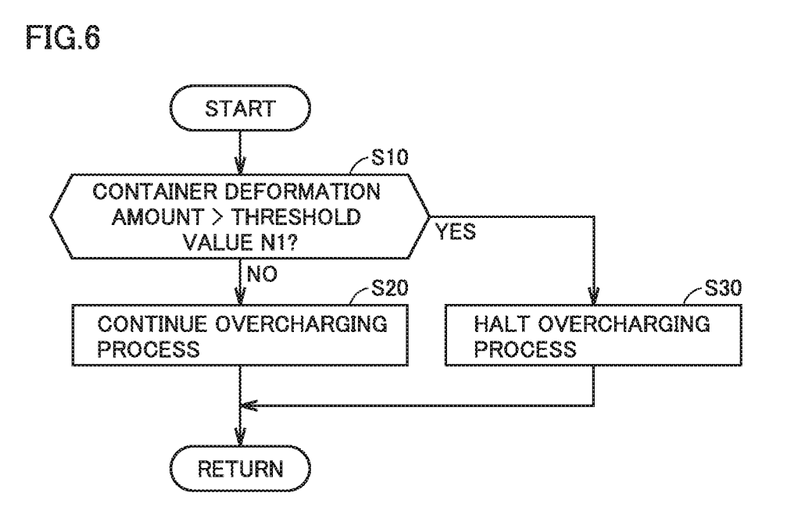
FIG. 6 is a first flowchart showing an exemplary procedure of a process by a controller.

FIG. 6 is a flowchart showing an exemplary procedure of a process performed by controller 600 during the overcharging process. For example, this flowchart is repeatedly performed at a predetermined cycle during the overcharging process.

Controller 600 determines whether or not the container deformation amount detected by dial gauge 400 exceeds threshold value N1 (step S10).

When the container deformation amount does not exceed threshold value N1 (NO in step S10), controller 600 continues the overcharging process because the deformation amount of container 2 is small and container 2 is less likely to be broken (step S20).

On the other hand, when the container deformation amount exceeds threshold value N1 (YES in step S10), controller 600 halts (aborts) the overcharging process because the deformation amount of container 2 is large and container 2 is likely to be broken (step S30). Accordingly, container 2 can be beforehand prevented from being broken due to the overcharging process.

As described above, according to recovering device 5 according to the present embodiment, during the overcharging process for nickel-metal hydride battery 1, the deformation amount of container 2 can be monitored while cooling container 2 of nickel-metal hydride battery 1 by the water cooling allowing for high cooling efficiency and while exhausting the gas generated in container 2 to outside. Therefore, even when applying a large amount of current to nickel-metal hydride battery 1 in the overcharging process in order to quickly complete the overcharging process, the overcharging process can be performed while precisely monitoring whether or not an abnormality occurs in nickel-metal hydride battery 1 to break container 2. As a result, the overcharging process for the nickel-metal hydride battery can be performed efficiently and appropriately.

Furthermore, recovering device 5 according to the present embodiment includes an exhausting device (second water bath 200, collection container 220, pipes H1 to H3, and the like) configured to collect, by the water displacement, gas generated within container 2 of nickel-metal hydride battery 1, and exhaust the collected gas to outside charging chamber 10 (exhaust duct 20). Accordingly, the gas generated within container 2 of nickel-metal hydride battery 1 can be completely collected by the water displacement and the collected gas can be exhausted appropriately.

<Modification 1>

In the above-described embodiment, the overcharging process is aborted when the container deformation amount exceeds threshold value N1 during the overcharging process. In addition to this, during the overcharging process (before the container deformation amount exceeds threshold value N1), an amount of operation of pump 110 may be increased in response to an increase in container deformation amount such that the container deformation amount is less likely to exceed threshold value N1 (such that the overcharging process is less likely to be aborted).

Figure 7:
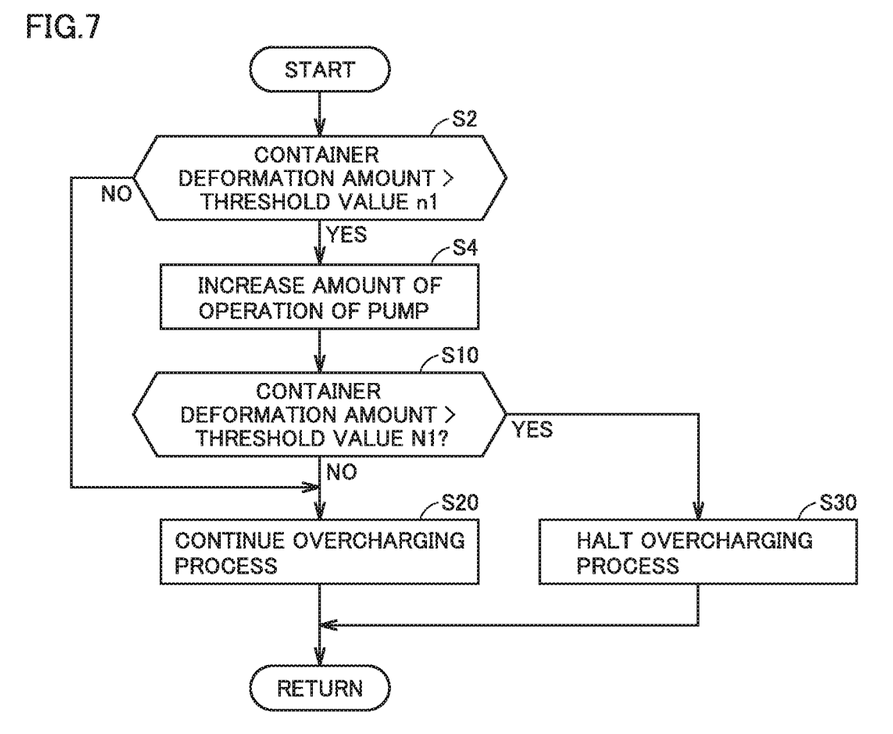
FIG. 7 is a second flowchart showing an exemplary procedure of a process by the controller.

FIG. 7 is a flowchart showing an exemplary procedure of an abnormality determination process performed during the overcharging process by controller 600 according to modification 1. The flowchart of FIG. 7 is obtained by adding steps S2, S4 to the flowchart of FIG. 6 above. The other steps (steps given the same numerals as those of the steps in FIG. 6 above) have been already described and therefore will not be described repeatedly here in detail.

Controller 600 determines whether or not the container deformation amount exceeds a threshold value n1 (step S2). Threshold value n1 is set to a value smaller than threshold value N1 by a predetermined value.

When the container deformation amount does not exceed threshold value n1 (NO in step S2), controller 600 brings the process to step S20 to continue the overcharging process.

When the container deformation amount exceeds threshold value n1 (YES in step S10), controller 600 increases the amount of operation of pump 110 (step S4). By thus increasing the amount of operation of pump 110 in response to the container deformation amount exceeding threshold value n1 (n1<N1), the efficiency of cooling container 2 by the water coolant is increased, thereby suppressing an increase in temperature within container 2. Accordingly, the container deformation amount can be less likely to exceed threshold value N1. Then, controller 600 brings the process to step S10.

As described above, during the overcharging process (before the container deformation amount exceeds threshold value N1), the amount of operation of pump 110 may be increased in response to the container deformation amount exceeding threshold value n1 (n1<N1). Accordingly, the container deformation amount can be less likely to exceed threshold value N1 (the overcharging process can be less likely to be aborted).

It should be noted that when increasing the amount of operation of pump 110 in the process of step S4, the amount of operation of pump 110 may be more increased as the container deformation amount is larger.

<Modification 2>

In the above-described embodiment, the overcharging process is aborted under the condition that the container deformation amount exceeds threshold value N1 during the overcharging process. However, conditions as to whether to abort the overcharging process may be added.

Figure 8:
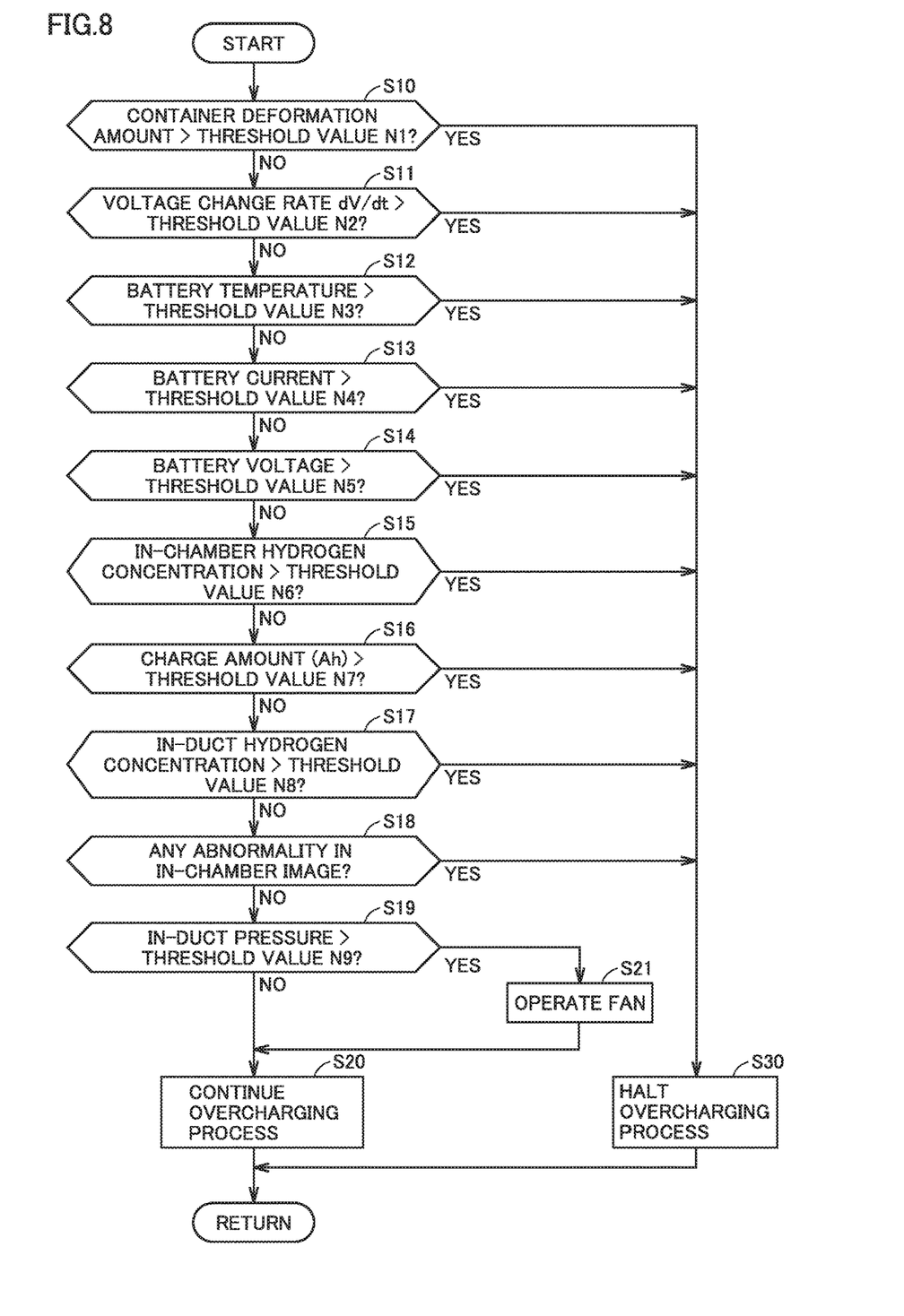
FIG. 8 is a third flowchart showing an exemplary procedure of a process by the controller.

FIG. 8 is a flowchart showing an exemplary procedure of an abnormality determination process performed during the overcharging process by controller 600 according to modification 2. The flowchart of FIG. 8 is obtained by adding steps S11 to S19 and S21 to the flowchart of FIG. 6 above. The other steps (steps given the same numerals as those of the steps in FIG. 6 above) have been already described and therefore will not be described repeatedly here in detail.

When the container deformation amount does not exceed threshold value N1 (NO in step S10), controller 600 determines whether or not a magnitude (hereinafter, also referred to as "voltage change rate dV/dt") of an amount of change of the battery voltage per unit time exceeds a threshold value N2 (step S11). This process is a process for determining whether or not the battery voltage is abruptly changed due to occurrence of an abnormality such as abrupt chemical change or disconnection of a wire in battery 1.

When voltage change rate dV/dt exceeds threshold value N2 (YES in step S11), controller 600 brings the process to step S30 to halt (abort) the overcharging process. Accordingly, when the abnormality such as the abrupt change of the battery voltage occurs, the overcharging process can be halted appropriately.

When voltage change rate dV/dt does not exceed threshold value N2 (NO in step S11), controller 600 determines presence/absence of various abnormalities in steps S12 to S19.

Specifically, in step S12, controller 600 determines whether or not the battery temperature exceeds a threshold value N3. In step S13, controller 600 determines whether or not the battery current exceeds a threshold value N4. In step S14, controller 600 determines whether or not the battery voltage exceeds a threshold value N5. Moreover, in step S15, controller 600 determines whether or not the in-chamber hydrogen concentration exceeds a threshold value N6. In step S16, controller 600 determines whether or not the charge amount (Ah) exceeds a threshold value N7. In step S17, controller 600 determines whether or not the in-duct hydrogen concentration exceeds a threshold value N8. In step S18, controller 600 determines whether or not a certain abnormality is confirmed in the in-chamber image. When YES is determined in any of steps S12 to S18, controller 600 brings the process to step S30 to halt (abort) the overcharging process.

When NO is determined in any of steps S12 to S18, controller 600 brings the process to step S19 to determine whether or not the in-duct pressure exceeds a threshold value N9. When the in-duct pressure exceeds a threshold value N9 (YES in step S19), controller 600 operates fan 30 (step S21). Accordingly, air from fan 30 is supplied into exhaust duct 20 via charging chamber 10 to ventilate exhaust duct 20, thereby decreasing the in-duct pressure. Then, controller 600 brings the process to step S20 to continue the overcharging process.

On the other hand, when the in-duct pressure does not exceed threshold value N9 (NO in step S19), controller 600 continues the overcharging process without operating fan 30 (step S20).

As described above, the conditions as to whether to abort the overcharging process may be added. Accordingly, the overcharging process for nickel-metal hydride battery 1 can be performed efficiently and more appropriately.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A recovering device for recovering a nickel-metal hydride battery having a container provided with an exhaust valve configured to exhaust gas generated in the container to outside, the recovering device comprising:
   a liquid bath configured to store liquid coolant;
   a fixing device configured to fix the nickel-metal hydride battery to the liquid bath with at least a portion of the container of the nickel-metal hydride battery being immersed in the liquid coolant in the liquid bath;
   a circulating device configured to circulate the liquid coolant in the liquid bath;
   a deformation amount detector configured to detect a deformation amount of the container of the nickel-metal hydride battery with the nickel-metal hydride battery being fixed to the liquid bath by the fixing device;
   an exhausting device configured to collect the gas exhausted from the exhaust valve of the nickel-metal hydride battery and exhaust the gas to outside the recovering device;
   a charger configured to charge the nickel-metal hydride battery; and
   a controller configured to perform an overcharging process for overcharging, using the charger, the nickel-metal hydride battery fixed to the liquid bath by the fixing device while circulating the liquid coolant in the liquid bath using the circulating device, wherein
   during the overcharging process, the controller is configured to
      continue the overcharging process when the deformation amount of the container is less than a threshold value, and
      halt the overcharging process when the deformation amount of the container exceeds the threshold value.

2. The recovering device for recovering the nickel-metal hydride battery according to claim 1, wherein during the overcharging process, the controller is configured to increase an amount of operation of the circulating device in response to an increase in the deformation amount of the container.

3. The recovering device for recovering the nickel-metal hydride battery according to claim 1, further comprising a voltage detector configured to detect voltage of the nickel-metal hydride battery, wherein
   during the overcharging process, the controller is configured to halt the overcharging process when a magnitude of an amount of change of the voltage of the nickel-metal hydride battery per unit time exceeds a predetermined value.

4. The recovering device for recovering the nickel-metal hydride battery according to claim 1, wherein the exhausting device is configured to collect, by water displacement, the gas generated in the container of the nickel-metal hydride battery and exhaust the gas to outside the recovering device.

5. A recovering method for recovering a nickel-metal hydride battery having a container provided with an exhaust valve configured to exhaust gas generated in the container to outside, the recovering method comprising:

determining whether or not a deformation amount of the container exceeds a threshold value during an overcharging process for overcharging the nickel-metal hydride battery with at least a portion of the container of the nickel-metal hydride battery being cooled by liquid coolant;

continuing the overcharging process when the deformation amount of the container is less than the threshold value; and halting the overcharging process when the deformation amount of the container exceeds the threshold value.

* * * * *